United States Patent [19]
Zito

[11] Patent Number: 5,422,197
[45] Date of Patent: Jun. 6, 1995

[54] ELECTROCHEMICAL ENERGY STORAGE AND POWER DELIVERY PROCESS UTILIZING IRON-SULFUR COUPLE

[75] Inventor: Ralph Zito, Chapel Hill, N.C.

[73] Assignee: National Power PLC, Whiltshire, United Kingdom

[21] Appl. No.: 128,123

[22] Filed: Sep. 29, 1993

Related U.S. Application Data

[63] Continuation-in-part of Ser. No. 961,123, Oct. 14, 1992, abandoned.

[51] Int. Cl.$^6$ .............................................. H01M 2/38
[52] U.S. Cl. ........................................ 429/51; 429/61; 429/90; 429/199; 429/188
[58] Field of Search .................. 204/DIG. 4; 429/14, 429/15, 22, 51, 61, 90, 199, 188

[56] References Cited

U.S. PATENT DOCUMENTS

| | | | |
|---|---|---|---|
| 2,615,932 | 10/1952 | Marko | 136/122 |
| 2,669,598 | 2/1954 | Marko | 136/122 |
| 3,077,507 | 2/1963 | Kordesch | 136/86 |
| 3,121,028 | 2/1964 | Story | 136/6 |
| 3,227,585 | 1/1966 | Langford | 136/86 |
| 3,540,934 | 11/1970 | Boeke | 136/86 |
| 3,663,300 | 5/1972 | Nanis et al. | 136/86 |
| 3,920,474 | 11/1975 | Zito, Jr. et al. | 136/86 |
| 4,038,460 | 7/1977 | Walsh et al. | 429/15 |
| 4,053,684 | 10/1977 | Zito, Jr. et al. | 429/15 |
| 4,069,371 | 1/1978 | Zito | 429/21 |
| 4,117,204 | 9/1978 | Zito, Jr. | 429/19 |
| 4,215,182 | 7/1980 | Ang et al. | 429/15 |
| 4,218,519 | 8/1980 | Frank | 429/15 |
| 4,230,549 | 10/1980 | D'Agostino et al. | 259/8 |
| 4,328,287 | 5/1982 | Sammells et al. | 429/15 |
| 4,339,473 | 7/1982 | D'Agostino et al. | 427/44 |
| 4,343,868 | 8/1982 | Putt | 429/17 |
| 4,367,159 | 1/1983 | Mrazek et al. | 429/199 |
| 4,390,602 | 6/1983 | Struthers | 429/26 |
| 4,407,902 | 10/1983 | Kummer | 429/15 |
| 4,414,090 | 11/1983 | D'Agostino et al. | 204/252 |
| 4,469,760 | 9/1984 | Giner et al. | 429/21 |

(List continued on next page.)

FOREIGN PATENT DOCUMENTS

| | | |
|---|---|---|
| 0039222 | 11/1981 | European Pat. Off. . |
| 165000 | 6/1985 | European Pat. Off. . |
| 1522304 | 3/1968 | France . |
| 61-206180 | 9/1986 | Japan . |
| 63-205057 | 8/1988 | Japan . |

(List continued on next page.)

OTHER PUBLICATIONS

Chemical Abstracts, vol. 115, No. 2, 15th Jul. 1991, Columbus, Ohio, US; Abstracts No. 12352x.
Extended Abstracts, vol. 80, No. 2, 5th Oct. 1980, Princeton, N.J., USA pp. 413–414.

(List continued on next page.)

*Primary Examiner*—Kathryn Gorgos
*Attorney, Agent, or Firm*—Antonelli, Terry, Stout & Kraus

[57] ABSTRACT

An electrochemical process for energy storage and power generation comprises a single cell or an array of unit cells (10), each cell comprising a positive electrode (12) and a negative electrode (14) with a membrane in each cell dividing it into positive and negative chambers (22C and 24C) for posilyte and anolyte solutions (22, 24) which are recirculated through separate pumps (26, 28) and storage tanks (32, 34) and back to the chambers. An iron-sulfur couple is employed, the overall reaction being:

$$2Fe^{3+} + S^{2-} = 2Fe^{2+} + S \qquad \text{eq. 8}$$

the $Fe^{3+}$ ions being provided as the chloride, bromide or iodide and the sulfide being provided as the sodium, potassium, lithium or ammonium salts. The $+^{ve}$ chamber contains a soluble ionic salt which acts as a charge carrier during energy storage, preferably sodium or potassium chloride. A pH control system can be provided to offset pH in the system, and further a third chamber (23C) can be provided whereby the system is more effectively electrically rechargeable.

12 Claims, 8 Drawing Sheets

U.S. PATENT DOCUMENTS

| | | | |
|---|---|---|---|
| 4,485,154 | 11/1984 | Remick et al. | 429/14 |
| 4,615,108 | 10/1986 | Tomazic | 29/623.2 |
| 4,786,567 | 11/1988 | Skyllas-Kazacos et al. | 429/19 |
| 4,828,942 | 5/1989 | Licht | 429/50 |

FOREIGN PATENT DOCUMENTS

| | | |
|---|---|---|
| 63-221562 | 9/1988 | Japan . |
| 1183071 | 7/1989 | Japan . |
| 980596 | 6/1963 | United Kingdom . |
| 1211593 | 11/1970 | United Kingdom . |
| 1237964 | 7/1971 | United Kingdom . |
| 1210693 | 10/1971 | United Kingdom . |
| 1364795 | 8/1974 | United Kingdom . |
| 2042250 | 2/1979 | United Kingdom . |
| 2010574 | 6/1979 | United Kingdom . |
| 1569399 | 6/1980 | United Kingdom . |
| WO89/05528 | 12/1988 | WIPO . |
| WO90/03666 | 6/1989 | WIPO . |

OTHER PUBLICATIONS

Chemical Abstracts, vol. 83, No. 12, 22nd Sep. 1975, Columbus, Ohio US; Abstract No. 100755 g.

Proceedings of the 20th Intersociety Energy Conversion Engineering Conf. vol. 2, Aug. 1985, pp. 2.105–2.110.

Extended Abstracts, vol. 83, No. 2, 9th Oct. 1983, Princeton, N.J. USA pp. 165–166.

Journal of the Electrochemical Society, vol. 134, 5th May 1987 Manchester, N.H., USA pp. 1064–1070.

Journal of the Electrochemical Society, vol. 117, No. 12, Dec. 1970, Manchester, N.H. USA; pp. 1527–1529.

Journal of Electrochemical Society 1987, Vo. 134, No. 9 pp. 2137–2141; "An Energetic Medium for Electrochemical" No month available.

Batteries International; Jan. 1992 pp. 80–81, Fabjan; Austrians Succeed with Zinc–Bromine.

Aqueous polysulphide flow-through electrodes PM Lessner J Appl Electrochem 22 (1992) 927–934 No month available.

Electrolysis of sodium sulphide solutions WR Fetzer (1928) No month available 1787-180 7.

Electrode photoelectrochemical storage cells; Bratin; J. Electrochem Soc 129-11 (1982) pp. 2469-2473 No month available.

Bromine diffusion through Nafion perfluorinated ion exchange membranes FG Will; J. Electrochem Soc. 126 1 (1979) 36-41 No month available.

On the nature of blue solutions of sulfur W. Giggenbach J. Inorgs Nucl Chem 30 (1968) 3189-3201 No month available.

Equilibria involving polysulfide ions WF Giggenbach J. Inorg Chem 13 7 (1974) 1724-1730 No month available.

Kinetics of Polysulfide-thiosulfat disproportionation WF Giggenbach Inorg Chem 13 7 (1874) 1730-1733 No month available.

The blue solution of sulfur in water at elevated temperatures W. Giggenbach Inorg Chem 10 6 (1971) 1306-1308 No month available.

Kinetics of aqueous polysulfide solutions I; P Lessner J. Electrochem Soc 133 12 (1986) 2510-2516 No month available.

Kinetics of aqueous polysulfide solutions III; P. Lessner J. Electrochem Soc 133 12 (1986) 2517-2522 No month available.

Kinetics of aqueous polysulfide solutions; P. Lessner J. Electrochem Soc 135 1 (1988) 258-259 No month available.

Thermodynamics of aqueous sulfur species; RC Murray J. Electro-Chem Soc 130 4 (1983) 866-869 No month available.

Cation exchange selectivity of a perfluosulfonate polymer HL Yager ACS Symposium Series 180 (1982) 25-39 No month available.

Transport properties of perfluosulfonate polymer membranes; HL Yager ACS SymposiumSeries 180 (1982) 41-63 No month available.

The cluster network model of ion clustering; TD Gierke ACS Symposium Series 180 (1982) 283-307 No month available.

Patent Abstract of Japan, vol. 8, No. 13 (1450) (E-222) 20 Jan. 1984.

ELECTROCHEMICAL ENERGY STORAGE AND POWER DELIVERY PROCESS UTILIZING IRON-SULFUR COUPLE

CROSS REFERENCE TO RELATED APPLICATIONS

The present application is a continuation-in-part of my U.S. patent application Ser. No. 961,123, filed Oct. 14, 1992, now abandoned.

Reference is also made to my U.S. patent application Ser. No. 961,111, Electrochemical Energy Storage and for Power delivery with pH Control, and my U.S. patent application Ser. No. 961,112, Electrochemical Apparatus for Energy Storage and/or Power Delivery Utilizing Iron-Sulfur Couple: all of common assignment and filed on the same date as my application Ser. No. 961,123.

FIELD OF THE INVENTION

The present invention relates generally to energy storage and power generation systems wherein compensating electrochemical reactions occur at opposite positive (hereinafter $+^{ve}$) and negative (hereinafter $-^{ve}$) electrodes and energy is stored in, and drawn from, an electrolyte in charge and discharge cycles. The reactions in the class of such systems of interest for the purposes of this invention are substantially reversible such that driving current into such a system charges the system by storing energy in chemical reactants. Chemical reactions take place on either side of an ion transport system (such as a membrane or multiple membranes and/or intermediate cell sections) with selective charge carriers being transported through the membrane. During power generation these chemical reactions reverse supplying current (power) to a load.

Some systems reconstitute or regenerate the reagents to restore the cell, as compared to driving current into the cell.

BACKGROUND OF THE INVENTION

Such energy systems have been known for many years. Major limitations of these systems have resulted from the practical application of what seems to be a simple direct chemical process. Hazardous materials, efficiencies, system size, plugging and clogging, gas formation, "plating out" or precipitation of the materials, membrane diffusion limitations, cost of materials and cost of operation highlight the practical problems. Another limitation of such systems is the loss of power output as the system discharges.

The fundamental chemical process in these systems is characterized by a chemical equation where the action proceeds in one direction in the charging of the system and in the opposite direction during the power generation by the system. An example of a redox system is given by the following chemical equation, the term "redox" defining reactions in which a reduction and a complementary oxidation occur together.

$$Cr^{2+} + Fe^{3+} \rightleftharpoons Cr^{3+} + Fe^{2+} \qquad \text{Eq. 1}$$

In this system, limitations exist since the chromium is expensive and the chromium and iron, meant to be on either side of a membrane, cross over contaminating the other side. This necessitates frequent reprocessing of the electrolyte. Furthermore, noble metal catalysts are required to promote the reaction. Also, the system pH must be controlled to prevent gas formation.

U.S. Pat. No. 3,920,474 discloses a fuel cell which uses a source of sulfide ions as fuel in the negative chamber of a cell in which the positive and negative chambers are separated by an ion-transfer or mechanically porous membrane. The catholyte may comprise ferric chloride with the overall reaction being $$2Fe^{3+} + S^{2-} \rightarrow S + 2Fe^{2+}$$

This system acts as a fuel cell only for the delivery of power to a load and cannot be electrically recharged.

U.S. Pat. No. 4,485,154 discloses an electrically rechargeable anionically active energy storage and power delivery system using a sulfide-polysulfide anolyte reaction and an iodide-polyiodide, chloride-chlorine or bromide-bromine catholyte reaction.

An object of this invention is to provide a redox process for energy storage and power delivery process where no solids are deposited on the electrodes and where the electrolytes can be electrically restored at least initially.

It is yet another object of the invention to provide a safe process with a sufficient power density depending upon the application needs.

Another object of this invention is to provide substantially full power even at low states of charge of the system, i.e. the system power production stays constant over time maintaining substantially the same output until close to complete discharge.

SUMMARY OF THE INVENTION

The foregoing objects are met in a process which utilizes a chemical reaction characterized by the following overall chemical equation, $$2Fe^{3+} + S^{2-} \rightleftharpoons 2Fe^{2+} + S \qquad \text{Eq. 2}$$

where the ions are provided from salts of these reagents, preferably iron chloride in aqueous solution on the $+^{ve}$ side and potassium sulfide solution on the $-^{ve}$ side. It will be understood that other iron salts may also be used, such as the bromide or iodide. Whilst $K_2S$ is preferred for use in the invention, sodium sulfide, $Na_2S$, will work almost as well, except that $Na_2S$ is much less soluble than $K_2S$.

The process of the present invention is carried out in a single cell or in an array of cells, each of which has a $+^{ve}$ electrode and a $-_{ve}$ electrode, in which circulating electrolyte flows are maintained. An ion exchange membrane between the electrodes divides the cells into $+^{ve}$ and $-^{ve}$ chambers. The electrolyte circulating through the $-^{ve}$ chamber during power delivery contains sulfide ions and the electrolyte circulating through the $+^{ve}$ chamber during power delivery contains $Fe^{3+}$ ions. Additionally a soluble, ionic salt selected from sodium, potassium, lithium and ammonium salts, circulates through the $+^{ve}$ chamber of the cell during energy storage (charging) and acts as a charge carrier. For some purposes, as described below in further detail, a double membrane is provided forming a buffer chamber between the membranes.

The electrochemical reaction of Eq. 2 actually occurs in separate but dependent iron and sulfur reactions. The iron reaction takes place on the $+^{ve}$ side of the membrane and the sulfur reaction on the $-^{ve}$ side. The charge balance is provided by the transport of sodium, potassium, lithium or ammonium ions across the membrane.

When charging occurs, Eq. 2 goes from right to left, and when discharging (power supplied to a load), Eq. 2 goes from left to right.

The reagents involved in the process are as follows:
In the discharged state:
the $+^{ve}$ side contains $FeCl_2 + KCl + H_2O$, and
the $-^{ve}$ side $K_2S_5 + H_2O$.
In the charged state:
the $+^{ve}$ side $FeCl_3 + H_2O + KCl$, and
the $-^{ve}$ side $K_2S + H_2O$.

The stoichiometric ratio of $FeCl_3$ and $K_2S$ required to fully utilize these reagents is 4 moles $FeCl_3$ to 2.5 moles $K_2S$, according to the equation:

$$8\ FeCl_3 + 5\ K_2S \rightleftharpoons 8\ FeCl_2 + K_2S_5 + 8\ KCl \qquad \text{Eq. 2A}$$

The primary charge carriers are potassium ions, $K^+$, which are readily transported through the ion exchange membrane. The $Fe^{3+}$ or $Fe^{2+}$ are poorly transported through the membrane despite the fact that it is a cation exchange membrane. The sulfide ions, $S^{2-}$, are anions that are not transported through the cation exchange membrane.

These transport properties are most important. Iron sulfide is insoluble in water. Hence, any transport of either sulfide across from the $-^{ve}$ side to the $+^{ve}$ side, or the transport of ferric or ferrous from the $+^{ve}$ side to the $-^{ve}$ side will result in unwanted precipitates which will clog the membrane.

In addition to the above, another feature working in favour of the system of this invention is that during discharge the transport or charge carrier processes are going in the correct direction. That is, all positive ions are trying to move into the $+^{ve}$ side, and all $-^{ve}$ ions are attempting to move into the $-^{ve}$ side. Since the membrane is a cation exchange membrane, very few $Cl^-$ ions are lost to the $-^{ve}$ side.

During charge, however, the opposite is true, and a cell with only two compartments will not accept a charge if charge carrying ions are not present in the $-^{ve}$ chamber. Attempting to charge such a cell results in an immediate high resistance and virtually no current flows. Substantially no iron ions are transported across the membrane, and because the membrane is a cation exchange membrane, substantially no $S^{2-}$ ions are transported across it. In fact, any $S^{2-}$ attempting to migrate through the membrane reacts immediately with iron and a precipitate is formed which clogs the membrane.

To summarize, the charge carrier comprises sodium, potassium, lithium or ammonium ions, going from the $-^{ve}$ side to the $+^{ve}$ side through the membrane during the discharge portion of a cycle. The ferric ions in the $+^{ve}$ side are reduced to ferrous ions during discharge, and the $S^{2-}$ ions in the $-^{ve}$ side are oxidized to sulfur (solubilized as polysulfide ion during discharge). The total voltage for this process is 1.15 to 1.25 volts open circuit. With the $+^{ve}$ side $Fe^{3+} + e^- \rightarrow Fe^{2+}$, providing 0.70 to 0.75 volts, and the $-^{ve}$ side $S^{2-} \rightarrow S + 2e^-$, providing 0.45 to 0.50 volts.

During charging, $K^+$ ions are transported across the membrane from the $+^{ve}$ to the $-^{ve}$ side to balance the charge and transform $K_2S_5$ to $K_2S$. The sulfur which is present as a doubly charged polysulfide ion $S^{2-}.S_x$, (where $x$ may be as high as 4), is reduced initially to $S^{2-}.S_{x-1}$, and eventually to $S^{2-}$. The $Fe^{2+}$ is oxidized to $Fe^{3+}$ which goes into solution and is available to re-oxidize the $S^{2-}$ ions back to sulfur during discharge.

Flow of the electrolytes on both sides of the membrane(s) is/are provided, preferably a recirculation rather than a once through flow in the majority of end uses. The recirculation of the electrolytes provides a chemical replenishment of the electrolytes which operates in the present invention in addition to the electrical restoration of the $+^{ve}$ and $-^{ve}$ electrolytes. These recirculating electrolytes are stored in independent containers where the quantity may be large enough for the specific requirements of a preferred embodiment. The circulation also allows the electrolytes to be filtered, or otherwise reconstituted on a routine basis without taking the system off-line.

As the electrolyte in the $+^{ve}$ side is circulated, ferric ions in solution are absorbed at a surface of the $+^{ve}$ electrode and/or in a porous surface layer thereof and replenished at such sites as discharge reduces the ferric to ferrous ions. In addition, the surface of the $+^{ve}$ electrode is preferably coated with an active ingredient, preferably an activated carbon, which augments the iron reaction kinetics. This combination provides iron promptly for the discharge requirements, and thus provides full power until substantially fully discharged. During this discharge the output voltage of the cell is nearly constant, with little polarization loss.

The $-^{ve}$ side has a similar electrode which absorbs the $S^{2-}$ solution for subsequent discharge and enhances performance similar to that described at the $+^{ve}$ electrode.

Mid electrodes (also defined as intermediate or bipolar electrodes) combine the above such that a $+^{ve}$ electrode is provided on one surface, and a $-^{ve}$ electrode on another surface formed on the same substrate.

Depending upon the membrane efficiency there may be some diffusion of the iron ions into the $-^{ve}$ electrode side, resulting in a reagent loss on the $+^{ve}$ side, an electrolyte composition imbalance and a coulombic loss. Restoration of electrolyte balance and re-use of any iron sulfide precipitate is accomplished during recharging via a separate system.

Alternative preferred embodiments substitute sodium, lithium, or ammonium ions, or other appropriate substitutes, for the potassium as the charge carrier and in the sulfide solution.

Other objects, features and advantages will be apparent from the following detailed description of preferred embodiments thereof taken in conjunction with the accompanying drawings in which:

DETAILED DESCRIPTION OF THE PREFERRED EMBODIMENTS

In the following description, reference is made to the specific system utilizing iron chloride, sodium chloride (as the charge carrier) and sodium sulfide. It will be understood, however, that other salts may be substituted for these salts, as appropriate.

Figure 1A:
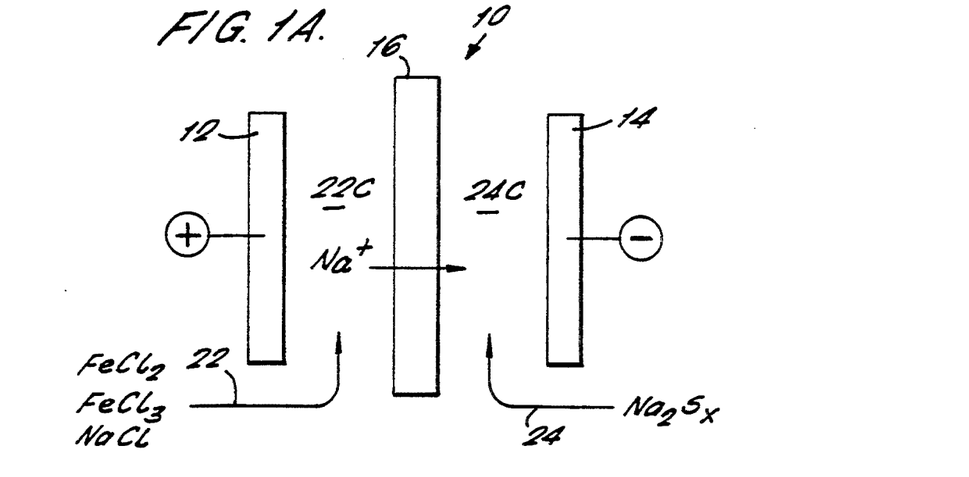
FIGS. 1A and 1B are schematic views of the basic components of two cell types (A and B) used according to a preferred embodiment of the invention.

Referring to the drawings, FIG. 1A shows a Type A cell 10 with a $+^{ve}$ electrode 12 and a $-^{ve}$ electrode 14. A cation membrane 16 is formed from a heterogeneous structure made by Sybron Chemical Co. called IONAC MC3470. In the above cell, the membrane 16 acts to separate the $+^{ve}$ and $-^{ve}$ sides of the cell 10 and is selected to minimize migration of iron from the $+^{ve}$ side to the $-^{ve}$ side and to minimize migration of $S^{2-}$ ions from the $-^{ve}$ to the $+^{ve}$ side. An aqueous solution 22 of $FeCl_3$, $FeCl_2$ and NaCl is provided in a chamber 22C formed between $+^{ve}$ electrode 12 and the membrane 16, and an aqueous solution 24 of $Na_2S_X$ is provided in a chamber 24C formed between the $-^{ve}$ electrode 14 and the membrane 16.

When the cell and the electrolyte system feeding it are in the charged state, a solution of ferric chloride of up to 4.0 molar concentration exists in the chamber 22C of the cell, and a solution of $Na_2S$ at 2.5 molar concentration, exists in chamber 24C of the cell. Typically, each of chambers 22C, 24C has a volume of about 200 cc. The cation membrane 16 allows the passage of charge via the transport of $Na^+$ ions.

FIG. 1A illustrates a cell which though rechargeable initially cannot be electrically recharged indefinitely. In this embodiment, the solutions should periodically be reconstituted externally to the cell and replaced. The charge carriers are the sodium ions ($Na^+$) which transfer charge through the membrane 16. During discharge (supplying power to an external load) the $Na^+$ ions are moving from the $-^{ve}$ side to the $+^{ve}$ side through the membrane. The ferric ions in the $+^{ve}$ side are being reduced to ferrous ions, and the $S^{2-}$ ions in the $-^{ve}$ side are being oxidized to sulfur (which is solubilized by the sodium sulfide). Also during discharge, the $-^{ve}$ ions are trying to move into the $-^{ve}$ side, but little $Cl^{31}$ is lost since the membrane is a cation exchange membrane.

The cation exchange membrane has to satisfy certain conditions with respect to conductivity and selectivity. It must freely transport $Na^+$ but exhibit a low diffusion rate for Fe cations. However, most cation exchange membranes, even the most selective, have Fe diffusion rates of the order of 500 μg cm$^{-2}$ h$^{-1}$ mol$^{-1}$. This effectively limits the charge/discharge cycles in a single membrane cell as eventually some iron will migrate across the membrane and react with $S^{2-}$ to form an insoluble precipitate in the membrane surface layer.

Figure 1B:
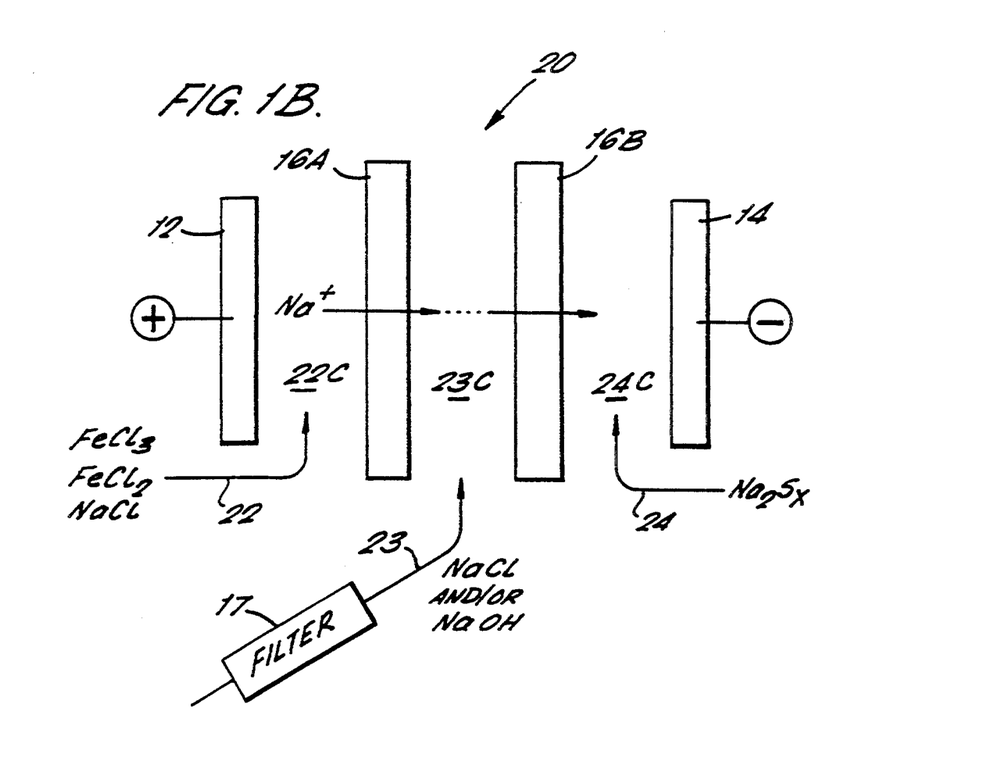

The FIG. 1B, the Type B cell is electrically rechargeable. This embodiment has, in addition to the two chambers of the type A cell, an additional middle chamber 23C separated from the other two chambers enclosing the electrodes by two cation exchange membranes 16A and 16B. The center chamber has an NaCl or NaOH solution 23 circulating through it which does not change composition (an "idler" electrolyte). When charging, $Na+$ ions are transported from the $+^{ve}$ side, through the middle chamber 23C (both membranes) into the $-^{ve}$ side However should any $Fe^{3+}$, $Fe^{2+}$ or $S^{2-}$ ions be transferred to the middle chamber they can be filtered through filter 17 out of the solution. When NaOH is in the middle chamber, any $Fe^{3+}$ or $Fe^{2+}$ ions present in that chamber will be precipitated as the hydroxide. There may be a need for pH control in either or both of chambers 22C and 24C as described later.

Using the three chamber rechargeable cell illustrated in FIG. 1B means that any precipitation will occur in the middle chamber, and can be removed without interfering with the main electrolyte flow circuits.

When charging the three chamber cell, $Na^+$ ions are transported across the cation membranes 16A and 16B from the $+^{ve}$ to the $-^{ve}$ side of the cell. The $Na^+$ ions transform the $Na_2S_5$ to $Na_2S$ and in the process S is reduced to $S^{2-}$ ions. At the $+^{ve}$ side ferric ions are produced (via oxidation of the ferrous ions at the $+^{ve}$ electrode 12) and remain in solution 22 (posilyte).

After many cycles, the middle chamber will accumulate some amount of iron sulfide precipitates, e.g., FeS and $Fe_2S_3$. These materials will eventually need to be removed from the system, or recycled. A method for the recycling or reclamation of these precipitates is shown in FIG. 1E. This method is a totally self contained process (within the energy system) and does not require the introduction of any additional chemical reagents.

As the liquid 23 is circulated to the idler tank chamber 25, it is passed through an ancillary electrochemical cell 27 specifically designed for reclamation. The $-^{ve}$ electrode 29 of this cell is porous carbon which will collect the iron sulfide precipitates as a filter in the stream of the liquid 23. The $+^{ve}$ electrode 30 is a lightly surfaced carbon composite substrate.

If the liquid 23 in the middle chamber 23C is an NaCl or KCl solution, electrolysis will generate iron within the porous carbon $-^{ve}$ electrode and $H_2S$ at the $+^{ve}$ electrode. The $H_2S$ is vented from cell 27 as a gas along line 31 back into the $-^{ve}$ electrolyte of the power cell where it reacts with NaOH or KOH to form $Na_2S$ or $K_2S$, respectively, for reuse as the energy storing reagents in the electrolyte. The reaction within the reclamation cell is as follows:

$$FeS + H_2O \rightarrow Fe° + H_2S + \tfrac{1}{2}O_2 \qquad \text{Eq. 3A}$$

The plated iron, Fe°, is later removed by the direct action of $Fe^{3+}$ ions in the positive side of the power cell by hydraulically switching the reclamation cell into the $+^{ve}$ electrolyte line.

If the liquid 23 in the middle chamber 23C is an NaOH or KOH solution, the reaction with the reclamation cell is:

$$FeS + 2NaOH \rightleftharpoons Fe° + Na_2S + H_2O + \tfrac{1}{2}O_2 \qquad \text{Eq. 3B}$$

When providing power, the cell, is discharging. In both type A and type B cells similar reactions occur at the two electrodes. At the $+^{ve}$ side electrode 12, ferric ions are reduced to ferrous ions, $Fe^{3+}$ to $Fe^{2+}$, and an electron is acquired from the external circuit. At the $-^{ve}$ electrode 14 sulfide ions are oxidized to molecular sulfur which is solubilized by the sodium sulfide. The electrons produced at the $-^{ve}$ electrode form the current through a load. The chemical reaction at the $+^{ve}$ electrode produces 0.7 to 0.75 volts (open circuit) and the chemical reaction at the $-^{ve}$ electrode produces 0.45 volts (open circuit). The combined reaction produces 1.15 to 1.20 volts per cell (open circuit).

Figure 1C:
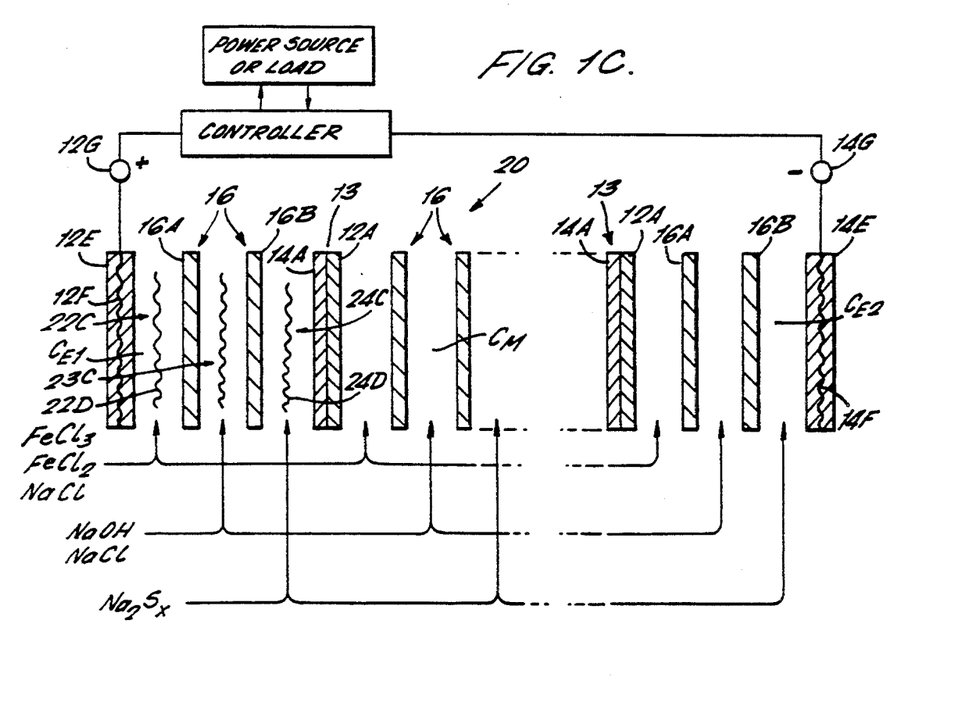
FIG. 1C is diagram of a cell array using the FIG. 1B type B cells.

FIG. 1C shows a cell array 20 of multiple cells connected in electrical series and fluid parallel. End electrodes 12E ($+^{ve}$) and 14E ($-^{ve}$) and multiple mid-electrodes 13 (each one having a $+^{ve}$ electrode portion 12A and $-^{ve}$ electrode portion 14A) are spaced out from each other by membranes 16 and screen or mesh spacers 22D, 24D in all the cell chambers 22C, 24C, (portions of two of which 22D, 24D are shown by way of example) to form end cells $C_{E1}$ and $C_{E2}$ and an array of n# of mid cells $C_M$ (typically 10–20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to a motor M via a control circuit CONT, the motor driving a vehicle) or to power sources (e.g. a utility power grid when used as a load levelling device).

Figure 1D:
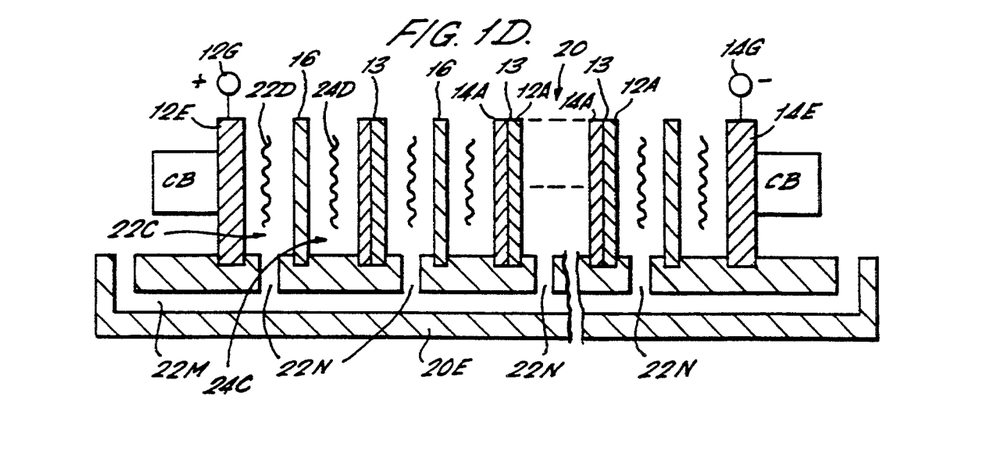
FIG. 1D shows an encapsulation of an array of cells.
Figure 1E:
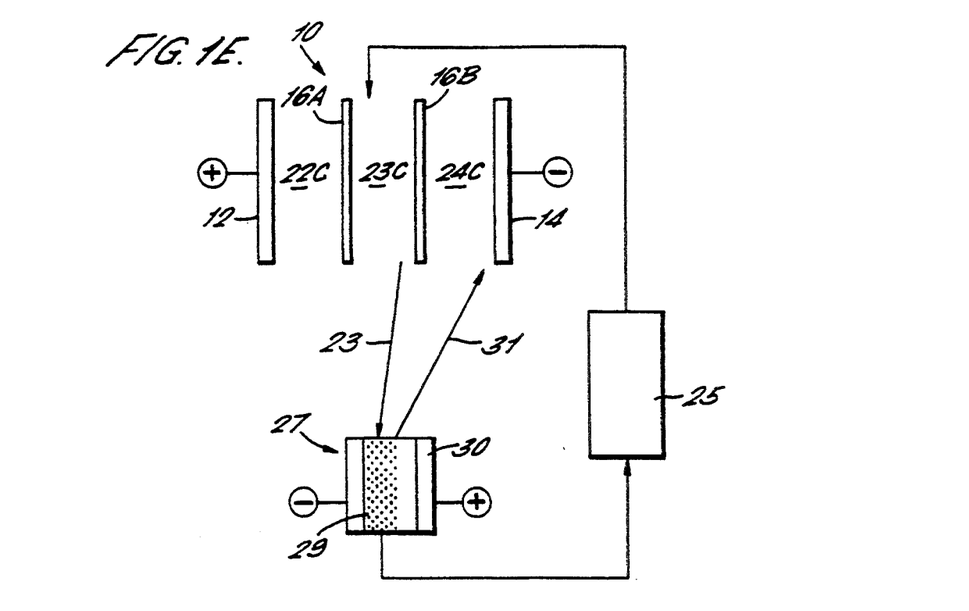
FIG. 1E shows a reclamation technique.

FIG. 1D shows the manner of encapsulating a cell array such as that of FIG. 1C. A cell array 20 (such as shown in FIG. 1C) is held between clamping blocks CB and dipped at one edge into a shallow container having a bath of liquid epoxy resin (not shown) therein. The epoxy resin hardens to form a wall of the battery. Flow conduits such as manifold 22M with feed tubes 22N for the FeCl3/NaCl solution feed are provided (a similar arrangement (not shown) being provided for the sodium sulfide solution feed). These flow conduits are simultaneously encapsulated with the electrode and membrane edges.

The cell array is rotated 90 degrees and the process repeated three times to form four long walls. Manifolds and tubes for electrolyte withdrawal are provided at the top face. Additional encapsulation can be provided at the backs of end electrodes 12E, 14E.

An alternative approach to encapsulation is to use a dissolvable or low melting point solid to fill the cell chambers 22C, 24C, and the manifolds and tubes of essentially all cells of battery 20. The battery is then dipped in its entirety into a deep epoxy resin bath. After the epoxy resin hardens, the battery is subjected to water or other solvent fed through its circulatory path to dissolve the solid, or is heated to melt the solid.

Another effective encapsulation approach is a plate and frame structure (not shown) which has enough short-term sealing integrity to permit a single pouring of encasing polymer (epoxy). The polymer provides the long-term sealing along all edges of the electrodes and membranes.

In either embodiment of encapsulation the goal is to safeguard against: (a) cell to cell leakage; (b) leakage between tubes and between manifolds; (c) leakage to the environment; and (d) to provide short lengths of narrow cross section tubes.

Figure 2A:
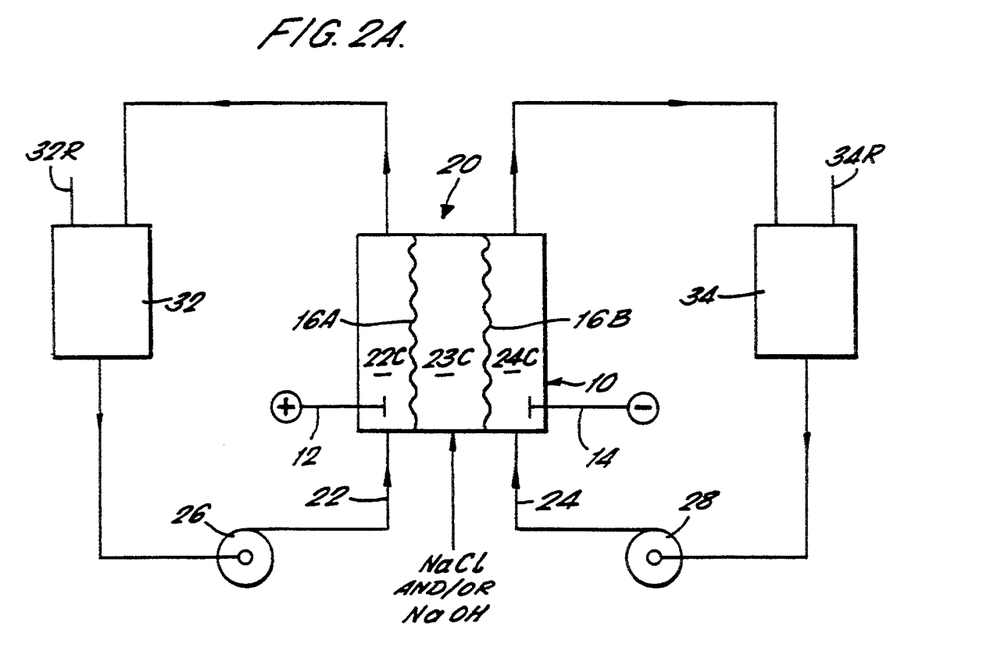
FIG. 2A is a block diagram of a full system using one or both types of the cells of FIG. 1A and FIG. 1B.

FIG. 2A shows a free flow system, a power generation/storage system utilizing one or more of the cells or cell array formats 20. Each cell 20 receives electrolyte through pumps 26 and 28 for the FeCl3/NaCl and Na2S5 solutions (22 and 24, respectively). The electrolytes 22 and 24 are stored in containers 32 and 34 large enough for the needs of a particular job. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent.

Fabrication of Electrodes

End electrodes differ from the mid electrodes because they must have a metallic conductor embedded within the structure running across the electrode area. This is required because the resistivity of the substrate material from which they are formed is too high to allow adequate electrical conduction to an external electrical connector. For example, a 25 cm by 25 cm square (10 inch by 10 inch square) of substrate material of 0.25 cm (0.10 inch) thickness will have a resistance of about 10 ohms where a corresponding cell has an internal resistance of about 0.01 ohms. A sheet of copper of 0.025 cm (0.010 inch) thickness with approximately the same area embedded into the electrode will reduce the effective resistance to about 100 micro ohms. The end electrodes are unipolar, whereas the mid-electrodes are bipolar. The conductor sheet is a thin screen structure embedded along the length of the end electrodes which make mechanically good contact along the current path.

The process of making the bipolar mid-electrodes is as follows. Substrates are formed of graphite flakes mixed with a plastic binder or other suitable binder, generally in a 1:1 weight ratio of such components. The mixture is freed from moisture by heating and/or desiccation methods, formed as sheets and hot pressed at temperatures and pressures appropriate to the materials used.

Then the substrates are coated on both the $-^{ve}$ and $+^{ve}$ surfaces with activated carbon particles by placing a sprinkling of such particles on mold plate surfaces and hot pressing the substrates to complete sealing of all voids in the substrate and to embed the particles in its surfaces. Suitable types of activated carbon for use in surfacing the electrodes are G212 of North America Carbon Co. (activated coconut carbon), UU of Barnebey-Cheney Co. (activated coconut carbon), GAC of Calgon Carbon Co., or PCB of Calgon Carbon Co. (activated coconut carbon).

After each pressing step, the press mold and its contents are cooled under pressure by using a water cooled heat exchanger to safeguard against bowing or warping and also to ensure a compact, non-porous structure.

End electrodes are prepared by making substrates by mixing graphite flakes and a plastic binder together, in the same general manner as described for the process of making bipolar mid-electrodes.

These substrates are then formed into a sandwich with a conductive screen, e.g. a copper screen, placed therebetween. This assembly is hot pressed to form the end electrode substrate and cooled under pressure to minimize warping.

One surface of this substrate is then surfaced with activated carbon or silicon dioxide particles, or a mixture of silicon dioxide/activated carbon particles, depending on whether a $-^{ve}$ electrode or a $+^{ve}$ electrode is being formed. This is effected by placing a sprinkling of the required particles (activated carbon or silicon dioxide) on the electrode surface and hot pressing to embed the particles in the surface thereof. After each pressing step the press mold and its contents are cooled, for example using a water-cooled heat exchanger to safeguard against bowing or warping.

Membranes

The preferred cation exchange membrane for use in the present invention is a heterogeneous structure made by Sybron Chemical Co. called IONAC MC3470 or NAFION made by Du Pont de Nemours (a homogenous cation exchange membrane). IONAC is a cation exchange membrane containing sulfonated resins as the functional materials bonded together with Kynar (a vinylidene fluoride resin). The material is bonded to a fibrous support sheet of glass cloth or polymer fiber. The specifications for this membrane are: 0.040 cm (0.016 inches) thick, 96% permselectivity and 5 ohms/-square cm in 1N NaCl.

Compensation for Migration

Because water is transferred across the membrane by osmosis or electro-osmosis, it becomes necessary to correct for this happening. This is accomplished by reverse osmosis or by evaporation of water from the appropriate electrolyte.

Power Enhancement

The surfaces of the electrodes are coated with a porous activated carbon which acts to absorb the iron solutions in the $+^{ve}$ side and to absorb the $S^{2-}$ solution in the $-^{ve}$ side. The large surface areas enhance the availability of the iron and sulfur during discharge. This enhancement provides better performance by maintaining the output voltage and power even when the cell is near complete discharge. Polarization losses are low.

pH Compensation

In the $+^{ve}$ side of a cell, the pH tends to rise (become more basic) as time progresses. This is due to the diffusion of $H^+$ ions from the chloride solution in the $+^{ve}$ side, to the $-^{ve}$ side, and in the $+^{ve}$ side the $FeCl_2$ and $FeCl_3$ salts in water mix with oxygen from the air forming iron oxides which eventually precipitate out of solution. To counter this, the pH of the electrolyte in the $+^{ve}$ side should be kept below 4.

Figure 2B:
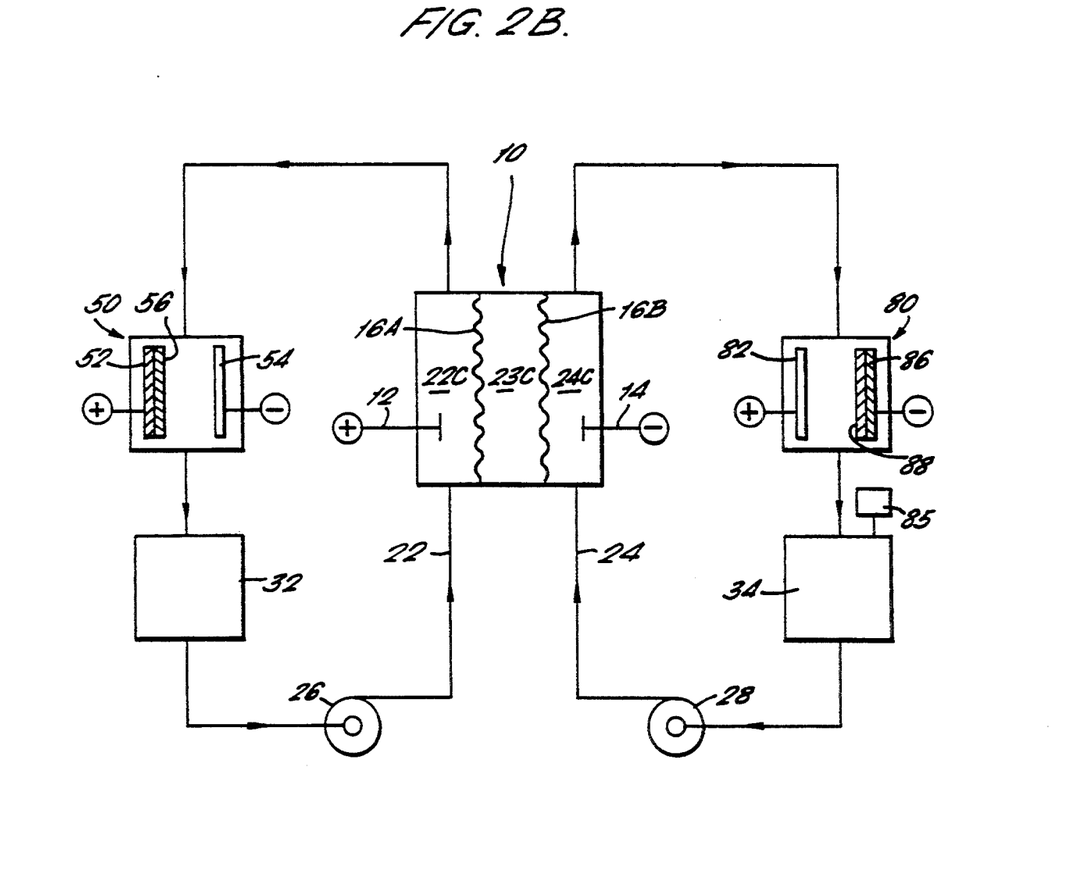
FIG. 2B shows a pH compensation cell on both sides.

FIG. 2B shows a pH control system in which pH control of both the $+^{ve}$ side and the $-^{ve}$ side of the cell 10 is effected. It will be understood that pH control will be required in some circumstances in one side of the cell 10 only, and this is within the scope of the invention.

Referring to the drawing, a pH control cell 50 is positioned in the flow path of the electrolyte 22 from the $+^{ve}$ chamber 22C of cell 10. A DC current is passed from the $+^{ve}$ electrode 52 to the $-^{ve}$ electrode 54 of the cell 50 at a voltage greater than 1.6 volts (in order to overcome the open circuit voltage of the pH control cell). The $+^{ve}$ electrode 52 has an activated carbon surface 56 which absorbs the electrolyte solution 22 and catalyses the formation of HCl and HClO. At the $-^{ve}$ electrode 54 of the cell 50, iron is produced which is dissolved by the ferric ions in the electrolyte 22 to form ferrous ions.

A pH control cell 80 is positioned in the flow path of the electrolyte 24 from the $-^{ve}$ chamber 24C of the cell 10. The $-^{ve}$ side of cell 80 has a "starved" cathode 86. A DC current is passed from the $+^{ve}$ electrode 82 to the $-^{ve}$ electrode 86, electrolyzing water to produce $H_2$ gas at the cathode 86, with the $OH^-$ ions also produced raising the pH of the electrolyte solution and thus compensating for the migration of $OH^-$ ions from the $-^{ve}$ side to the $+^{ve}$ side of cell 10. The cathode 86 of cell 80 is "starved" to maximize the $OH^-$ ion production and to minimize the production of sodium sulfide. The starving of the cathode 86 is accomplished by surfacing the cathode with a thick porous layer 88 which reduces the availability of the sodium polysulfides at the $-^{ve}$ electrode surface, thus promoting the electrolysis of water. A preferred porous surfacing for the cathode 86 is an unwoven polypropylene cloth, such as Webril cloth made by the Kendall Co.

At the $+^{ve}$ electrode of the pH control cell 80, the following reaction occurs:

$$S + Na_2S_X \rightarrow Na_2S_{X+1} \qquad \text{Eq. 4A}$$

At the $-^{ve}$ electrode of the pH control cell 80, the following reaction occurs:

$$H_2O + e^- \rightarrow OH^- + \tfrac{1}{2}H_2 \qquad \text{Eq. 4B}$$

The $H_2$ gas may be vented from the tank 34 by means of a vent 85.

The pH control cell 80 may, if desired, employ a membrane in order to divide the cell into a $+^{ve}$ chamber and a $-^{ve}$ chamber. In such an embodiment, the $H_2$ gas product may be vented directly from the $-^{ve}$ chamber of the cell.

Figure 2C:
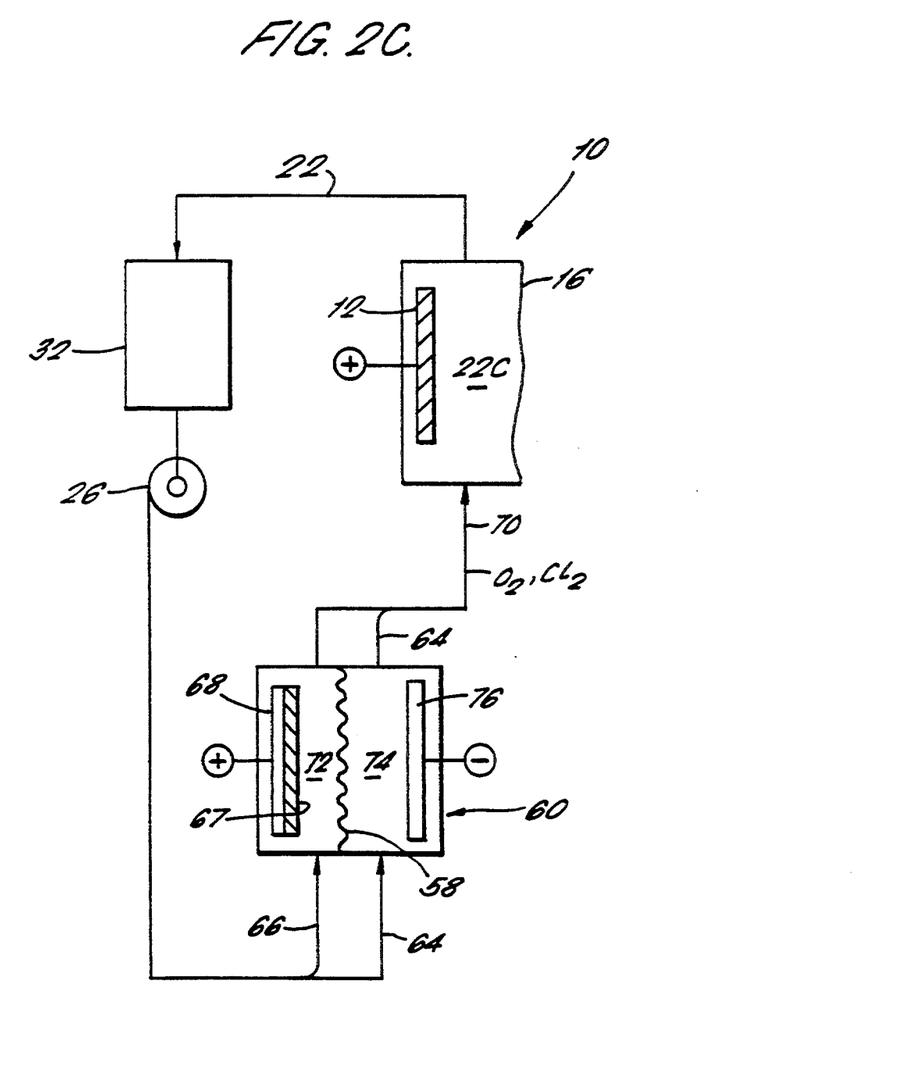
FIG. 2C shows an alternative pH compensation cell in the $+^{ve}$ side utilizing a membrane.

FIG. 2C shows a more complicated pH control cell 60 designed with two fluid chambers 72, 74 separated by a cation exchange membrane 58. This cation exchange membrane 58 permits only $H^+$ ions to transfer from the $+^{ve}$ to the $-^{ve}$ side of the pH control cell 60. The cell 60 has a $-^{ve}$ electrode 76 and a $+^{ve}$ electrode 68. The electrode $+^{ve}$ 68 is starved of $Cl^-$ ions by limiting the flow 66 of the electrolyte 22 to the anode surface by placing a diffusion limiting layer of a porous nonconductive material 67, such as fluorocarbon particles or silicon dioxide particles, on the anode surface. A DC current is passed through the cell from the $+^{ve}$ electrode 68 to the $-^{ve}$ electrode 76. At the $+^{ve}$ electrode 68, the electrolysis of water occurs forming oxygen gas at the electrode 68 and hydrogen ions in solution which are transported across the membrane 58 into the chamber 74 through which electrolyte stream 64 flows. These $H^+$ ions lower the pH of the electrolyte 22. Some chlorine is also produced at the $+^{ve}$ electrode, but it reacts with the ferrous ions in solution. The oxygen gas is vented into the main flow path 70 of the electrolyte to the chamber 22C of cell 10.

At the $+^{ve}$ side of the pH control cell 60, the following reaction occurs:

$$H_2O \rightarrow 2H^+ + \tfrac{1}{2}O_2 + 2e^- \qquad \text{Eq. 5}$$

At the $-^{ve}$ electrode of the pH control cell 60, iron is deposited on the $-^{ve}$ electrode 76, but the iron is dissolved by the ferric ions flowing through the chamber 74.

At the $-^{ve}$ side of the pH control cell 60, the following reaction occurs, in two steps:

$$Fe^{2+} + 2e^- \rightarrow Fe^\circ \qquad \text{Eq. 6A}$$

$$Fe^\circ + 2Fe^{3+} \rightarrow 3Fe^{2+} \qquad \text{Eq. 6B}$$

Specific Embodiments

The present invention will be further described with reference to the following non-limiting Examples. Examples 1 and 2 are comparative Examples carried out in cells in which no ionic salt is included in the electrolyte circulating in the $+^{ve}$ chamber during energy storage. In these comparative Examples the cells were conducted as primary devices, i.e. discharge only modes.

EXAMPLE 1

Fabrication of End Electrodes

Two substrates were prepared by mixing graphite flakes (#4012 graphite flakes of Asbury Carbon Co.) with a polyvinylidene fluoride, PVDF, binder (Penwalt's #461) in a 1:1 weight ratio. The mixture was heated to remove moisture, formed into sheets and hot pressed at a temperature of 177° C. (350° F.) and a pressure of 1723 kPa (250 psi) for 10 minutes, and then cooled at the same pressure between water cooled platens.

A stack was then formed, from bottom to top, of an aluminum base plate, Teflon (polytetra-fluoroethylene) sheet, substrate, a copper screen (0.025 cm. thick), the other substrate, a Teflon sheet, high temperature rubber sheet, and finally another aluminum base plate. The assembly was then pressed at 1034 kPa (150 psi) at 177° C. (350° F.) for 10 minutes, and then cooled at the same pressure between water-cooled platens.

The substrate to be surfaced had its edges covered with tape and was then placed on an aluminum base plate covered with a Teflon sheet, and a mixture of 80% graphite and 20% Kynar sprinkled over the surface. The surface of the substrate was then sprinkled with a layer of activated carbon particles (G212 of North American Carbon Co., or UU of Barnebey-Cheney Co.).

A high temperature rubber sheet was placed on top of the surfaced substrate, followed by a Teflon sheet and an aluminum base plate. The structure was then pressed at 517 kPa (75 psi) at 177° C. (350° F.) for 10 minutes, and then cooled at the same pressure between water-cooled platens.

The tape was then removed from the edges of the surfaced side and a rubber "picture" frame placed on top of the cleared border. The electrode was then placed with the surfaced side uppermost onto an aluminum base plate covered with a Teflon sheet and the top surface of the structure covered with a Teflon sheet and an aluminum base plate. The edges of the assembly were pressed at 2413 kPa (350 psi) at 177° C. (350° F.) for 210 minutes, and then cooled at the same pressure between water-cooled platens. This step sealed the substrate sheets along the edges in order to ensure that the copper screen was totally encapsulated to prevent corrosion by the electrolyte.

Cell Fabrication

A sealed single cell was made by placing a $+^{ve}$ electrode and a $-^{ve}$ electrode together with an IONAC MC3470 membrane therebetween. The four edges of the cell were cast with an epoxy resin to encapsulate the cell and ports formed to allow the electrolytes to be supplied to and to be removed from the cell.

The construction of the cell ensures that the copper screens and the wires attached, which make electrical contacts to the cell, do not contact the electrolyte.

Cell Performance

The above described cell was used, with UU carbon surfaced electrodes, spaced apart 0.50 inch, with the space between the electrode surface and membrane on each side being filled with G-212 porous carbon. The active area of the cell was 129 sq. cm (20 sq. in.)
The electrolytes were:
Positive side ... 100 cc of 3 molar solution of $FeCl_3$
Negative side ... 100 cc of 2 molar solution of $Na_2S$
Cell resistance ... 0.2 ohms Both solutions were in the charged state initially, and the cell was setup to be discharged only.

The maximum coulombic capacity of the cell assuming that the reaction to the pentasulfide shown below $$8\ FeCl_3 + 5\ Na_2S \rightleftharpoons 8\ FeCl_2 + 8\ NaCl + Na_2S_5 \qquad Eq.\ 7$$

goes to completion was:
$+^{ve}$ side ... 7.8 AH  $-^{ve}$ side ... 9.6 AH

The capacity was limited, in these examples, by the amount of $FeCl_3$ in solution in the positive side.

Four discharges were conducted, with the electrolyte being replaced after each discharge. Electrolyte replacement was accomplished by draining the cell compartments and refilling the compartments with fresh solutions three times in order to flush out the "spent" reagents within the surface pores of the porous G-212 carbon.

Table 1 gives the data obtained from these experiments.

TABLE 1

| | Discharge Data at The 2.0 Ampere Rate | |
|---|---|---|
| Cycle # | AH Output | % of Reagent $Fe^{3+}$ Utilization |
| 1 | 5.5 | 71 |
| 2 | 5.0 | 64 |
| 3 | 5.2 | 67 |
| 4 | 4.8 | 62 |

EXAMPLE 2

A cell was constructed in the manner as described in Example 1 except that the electrode-to-electrode spacing was 1.00 cm (0.40 inch). Even though the cell had static electrolytes (non-circulating) the solutions were stirred or agitated periodically to ensure adequate mixing and physical availability of ionic species at the electrode surfaces. The active area of the cell was 129 sq. cm. (20 sq. in.) with excess cell volume to accommodate additional electrolyte.

The electrolytes were:
Positive side ... 200 cc of 3 molar solution of $FeCl_3$
Negative side ... 200 cc of 2 molar solution of $Na_2S$
Cell resistance ... 0.08 ohms Both solutions were in the charged state initially, and the cell was setup to be discharged only.

The maximum coulombic capacity of the cell, assuming that the reaction to the pentasulfide shown in Eq. 7 goes to completion was:
$+^{ve}$ side ... 15.6 AH
$-^{ve}$ side ... 19.2 AH The capacity was limited, in these examples by the amount of $FeCl_3$ in solution in the positive side.

Two discharges were conducted, with the electrolyte being replaced after each discharge. The first discharge was at a 2 amp rate, and the second at a 4 amp rate. The discharge was quite flat to over 90% depth of discharge. Charge output was approximately 9 AH at useful voltages.

Figure 3:
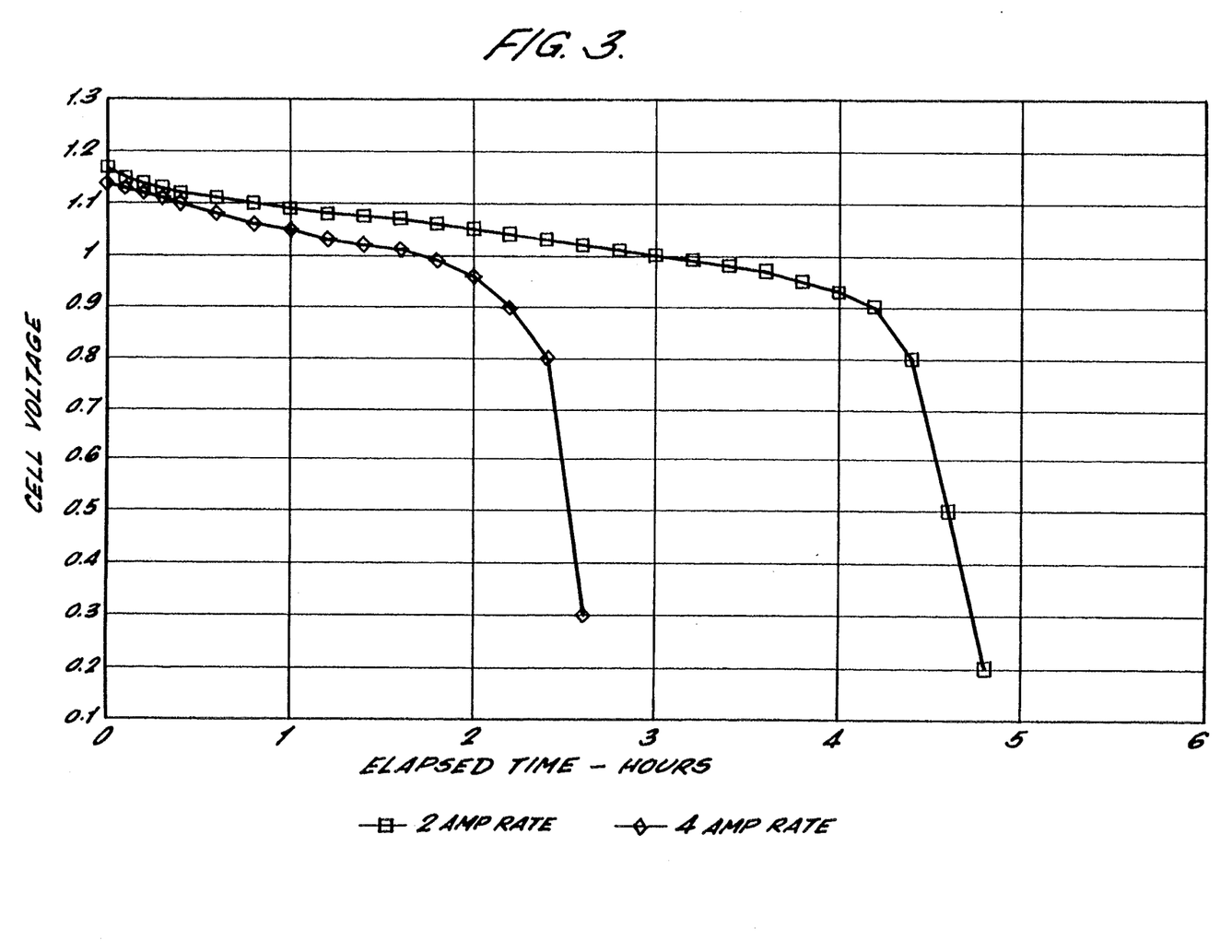
FIG. 3 is a graph of certain cells during discharge.

FIG. 3 is the discharge curve which is typical of the shape of the discharge curve for non-circulating electrolytes with adequate agitation or stirring. At various times during the discharging, attempts were made to recharge the cell by connecting the $+^{ve}$ and $-^{ve}$ electrodes of the cell to the $+^{ve}$ and $-^{ve}$ terminals, respectively, of a DC power supply. Within 10 to 20 seconds at less than 1 amp initial current, the cell resistance rose from its 0.2 ohms to over 100 ohms, and current diminished to less than 10 ma. Cell resistance continued to rise as long as the "charging" power supply was connected to the terminals.

Upon removal of the charging circuit and replacing the electrical load, the cell resistance decreased to its normal 0.2 ohm value, and discharging proceeded as usual. There were no observable remaining effects within the membrane as a result of the attempts to recharge electrically.

Since the available sodium ion concentration in the $+^{ve}$ side is low, $Fe^{3+}$ ions will tend to be the predominant charge carriers during "recharge". However, since substantially no $Fe^{3+}$ ions are transported across the membrane, the cation exchange membrane is rendered essentially non-conductive in the absence of charge carrying ions.

EXAMPLE 3

Cell tests in the previous two examples were conducted as primary devices, e.g. only discharge modes. These cells are essentially non-rechargeable devices because of the necessary limitations imposed by the membrane resistance to $Fe^{3+}$ transport and by the need to keep the two electrolytes apart. Only sodium ions can be allowed to migrate across the membrane during both charge and discharge with the $Fe^{3+}/S^{2-}$ couple.

In order to recharge this system electrically an ionic salt needs to be present in the $+^{ve}$ chamber during recharging, and furthermore, a configuration with more than two chambers is preferable.

A cell was assembled to characterize a rechargeable version of the above couple. The cell had static electrolytes (non-circulating) and three compartments. The $+^{ve}$ compartment contained the oxidizing agent, $FeCl_3$, and NaCl in aqueous solution and the $+^{ve}$ electrode. The $-^{ve}$ compartment contained the reducing agent, $Na_2S$, in aqueous solution and the $-^{ve}$ electrode. A middle compartment was an isolation chamber or buffer compartment. It contained a 2 molar solution of NaCl. Each of the three compartments was separated by a cation membrane. The physical parameters of the cell were as follows:

Single cell consisting of two identical end electrodes and two cation exchange membranes.

Membranes ... SYBRON Cation membranes (a heterogeneous structure comprising a cation exchange membrane containing sulfonated resins as the functional materials), Electrodes ... UU carbon surfaced substrates, prepared as described in Example 1

| Compartment spacing for electrolytes | 1.25 cm (0.50 inch) |
|---|---|
| Active area | 129 sq. cm (20 sq. in). |

Electrolytes were:
Positive side ... 200 cc of 3 molar solution of $FeCl_3$ and 1.5 molar solution of NaCl
Negative side ... 200 cc of 2 molar solution of $Na_2S$
Middle compartment ... 200 cc of 2 molar NaCl
Cell resistance ... 0.1 ohms
Both solutions were in the charged state initially.

The maximum coulombic capacity of the cell, assuming that the reaction to the pentasulfide shown in Eq. 7 goes to completion was:
$+^{ve}$ side ... 15.6 AH
$-^{ve}$) side ... 17.9 AH The capacity was limited, in these examples, by the amount of $FeCl_3$ in solution in the positive side.

Three partial cycles were run with the same electrolyte.

Table 2 gives the data obtained from these experiments.

TABLE 2

| Discharge Data at The 2.0 Ampere Rate | | | | |
|---|---|---|---|---|
| Reagent Cycle # Utilization | AH Output | AH Input | AH Efficiency | % of $Fe^{3+}$ |
| 1 | 10 | 12 | 83 | 64 |
| 2 | 12 | 14 | 86 | 77 |
| 3 | 9 | 11 | 82 | 58 |

Examination of the middle chamber electrolyte after the three discharges showed virtually no discoloration from the initial colorless and clear appearance. There was only very slight cloudiness detected which might indicate some presence of free sulfur or other insoluble compounds such as iron sulfide compounds.

EXAMPLE 4

A cell was constructed in the manner as described in Example 1 with a UU carbon surfaced $-^{ve}$ electrode and a GAC carbon surfaced $+^{ve}$ electrode. The electrodes were separated by a Nafion 117 membrane, the electrode spacing being 0.50 cm. The active area of the cell was 155 $cm^2$.

The electrolytes were:
Positive side ... 150 cc of solution of 3 molar $FeCl_3$ and 150 cc of molar NaCl
Negative side ... 300 cc of 1.25 molar solution of $Na_2S_5$
Cell resistance ... 78 milliohms
The electrolytes were recirculated through the respective compartments of the cell.

Figure 4:
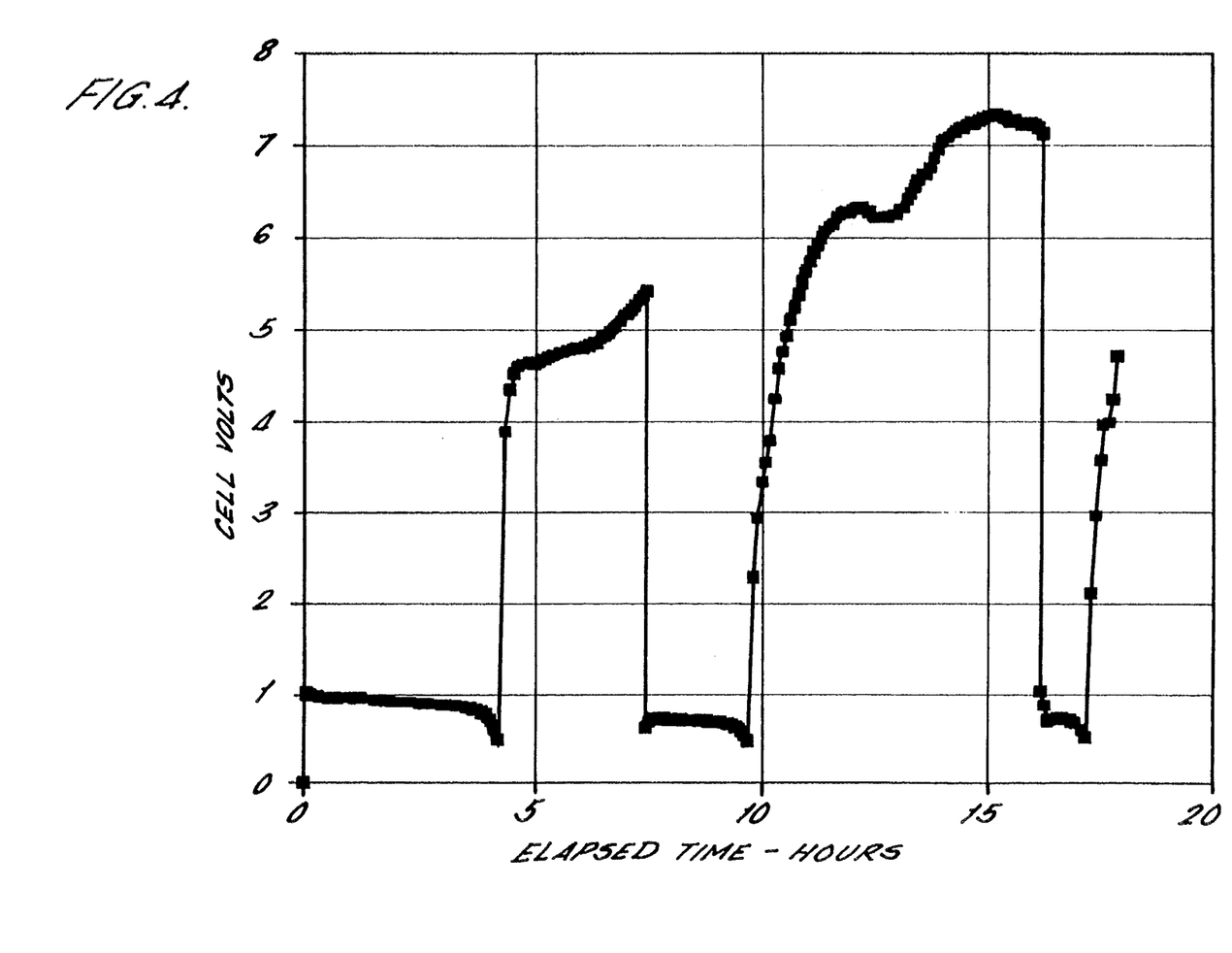
FIGS. 4 and 5 are graphs of the charge/discharge characteristics of certain cells.

Both electrolytes were in the charged state initially. The cell was discharged and charged over two cycles at 3 amps. The results are given in FIG. 4. It can be seen from these results that the charging potentials indicate a very large increase in resistance.

EXAMPLE 5

A cell was constructed in the manner as described in Example 4 with the compartments separated by Nafion 117 membranes. The electrolytes circulating in the $+^{ve}$ and $-^{ve}$ compartments were as described in Example 4. The middle chamber was a buffer chamber or isolation chamber through which 350 cc of a 2 molar solution of NaCl was circulated.

The spacings between the cell components were 0.25 cm from $-^{ve}$ electrode to membrane. 0.62 cm between the two membranes, and 0.25 cm from $+^{ve}$ electrode to membrane. The active area of the cell was 155 $cm^2$.

The cell resistance was 106 milliohms.

Figure 5:
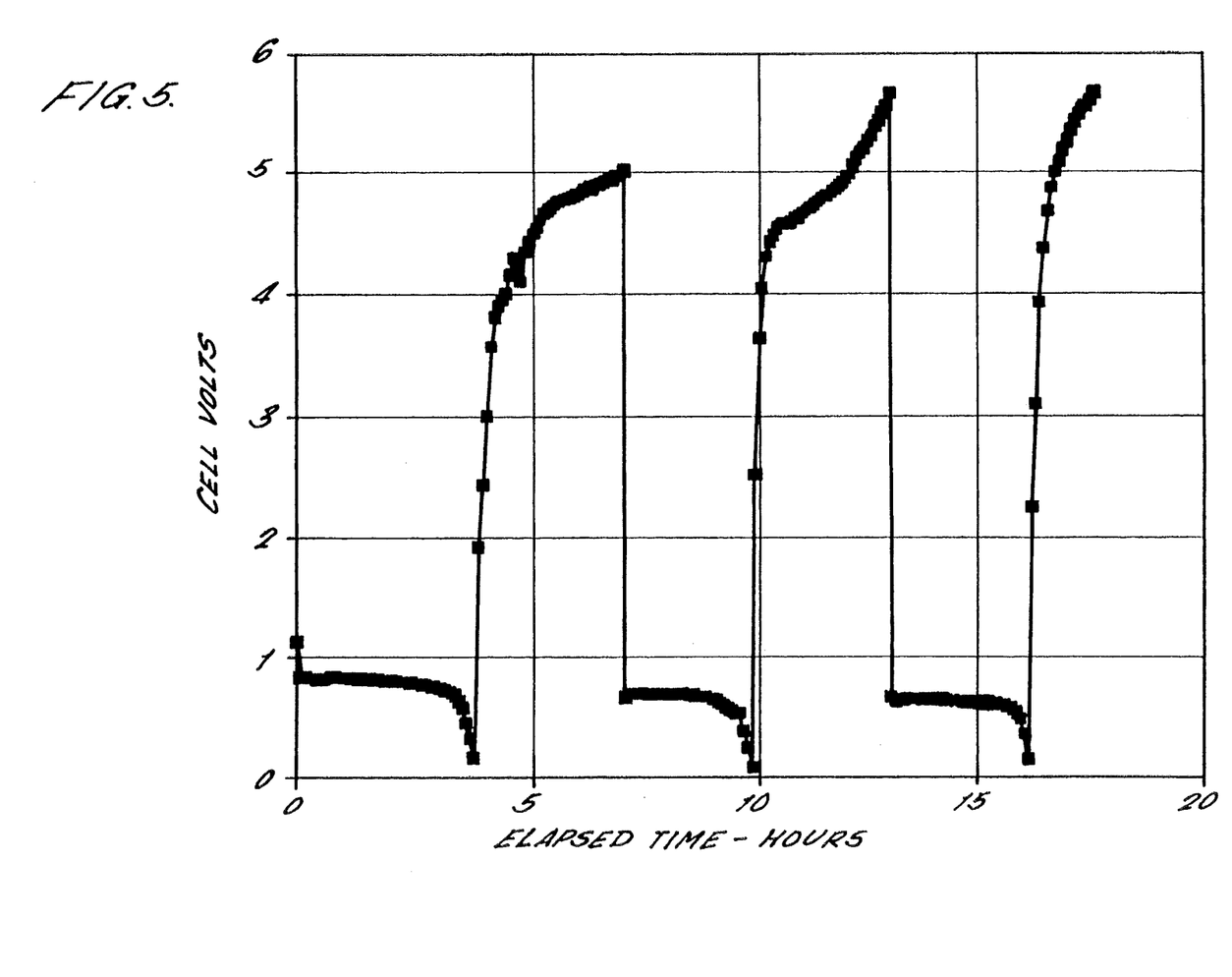

Both electrolytes were in the charged state initially. The cell was discharged and charged over three cycles at 3 amps. The results are given in FIG. 5. It can be seen from these results that the charging potentials indicate a very large increase in resistance. The resistance of the cell is, however, lower than that of the single membrane cell used in Example 4.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An electrochemical process for energy storage and power delivery comprising the steps of:
   (a) maintaining circulating aqueous electrolyte flows in a single cell or in an array of repeating cell structures, each cell with a positive chamber containing a positive electrode and a negative chamber containing a negative electrode, wherein said chambers are separated one from another by a cation exchange membrane, wherein the electrolyte circulating in the positive chamber during power delivery contains $Fe^{3+}$ ions and during energy storage contains $Fe^{2+}$, wherein the electrolyte circulating in the negative chamber during power delivery contains sulfide ions and during energy storage contains polysulfide ions and wherein the electrolyte circulating in the positive chamber during energy storage additionally comprises a soluble, ionic salt, selected from salts of the group consisting of sodium, potassium, lithium and ammonium salts, which acts s the charge carrier during energy storage, and
   (b) at least partially electrically restoring the electrolytes in said positive chambers and negative chambers during energy storage by providing voltage to transform $Fe^{2+}$ ions to $Fe^{3+}$ ions in the positive chamber and to transform polysulfide ions to sulfide ions in the negative chamber.

2. A process as defined in claim 1 wherein the $Fe^{3+}$ ions are provided in the electrolyte circulating in the positive chamber as a salt selected from the group consisting of chloride, bromide and iodide.

3. A process as defined in claim 1 wherein said soluble, ionic salt is selected from the group consisting of chloride, bromide and iodide of sodium, potassium, lithium or ammonium.

4. A process as defined in claim 3 wherein said soluble ionic salt is selected from the group consisting of sodium chloride and potassium chloride.

5. A process as defined in claim 1 wherein the sulfide is selected from the group consisting of sodium sulfide and potassium sulfide.

6. A process as defined in claim 1 wherein the electrolytes are chemically replenished by circulating the electrolyte to each chamber from a storage tank.

7. A process as defined in claim 1 wherein the cell structures are subjected to alternate electrochemical charge/discharge cycles.

8. A process as defined in claim 1 which additionally comprises compensating for the effect of changing pH in one or both chambers.

9. A process as defined in claim 8 wherein the pH compensation comprises the steps of flowing the circulating electrolyte from the positive chamber through a pH control cell, driving a DC current through the said pH control cell from a positive electrode to a negative electrode thereof, thereby producing the $H^+$ ions and lowering the pH of the electrolyte.

10. A process as defined in claim 8, wherein the pH compensation comprises the steps of flowing the circulating electrolyte from the negative chamber through a pH control cell, driving a DC current through the said pH control cell from a positive electrode to a negative electrode thereof, thereby producing $OH^-$ ions and raising the pH of the electrolyte.

11. A process as defined in claim 1 wherein the positive and negative electrodes comprise conductive porous particles.

12. A process as defined in claim 11 wherein the conductive porous particles are activated carbon particles.

* * * * *